United States Patent
Matthews

[11] 3,810,578
[45] May 14, 1974

[54] BULB MODULATING GAS VALVE

[75] Inventor: Russell B. Matthews, Goshen, Ind.

[73] Assignee: Johnson Service Company, Milwaukee, Wis.

[22] Filed: Oct. 17, 1972

[21] Appl. No.: 298,289

[52] U.S. Cl............................ 236/80, 236/84, 236/91
[51] Int. Cl............................................ F16k 31/145
[58] Field of Search .......... 236/91, 80, 9 R, 10, 84; 251/33, 43

[56] References Cited
UNITED STATES PATENTS
2,876,951  3/1959  Matthews............................ 236/84

Primary Examiner—William E. Wayner
Attorney, Agent, or Firm—Johnson, Dienner, Emrich, Verbeck & Wagner

[57] ABSTRACT

The disclosure of this invention describes a gas valve having an on — off control valve and a modulator valve which will modulate the gas flow from high fire to low fire over a predetermined temperature throttling range. The on — off control valve and modulator valve are mounted on top of a central body having a main gas passageway interconnecting its inlet and outlet. A main valve is used to open and close a main port formed within the gas passageway and a pressure diaphragm, which forms one wall of a closed chamber, is operably connected to this main valve such that increases in pressure within the chamber tend to open the main gas port. The on — off control valve includes a two-position valve means for providing the opening and closing of a second port disposed in a bypass passageway extending between the inlet and closed chamber. A remote thermostat provides actuating signals for energizing or deenergizing the on — off control valve to reposition the two-position valve means. A modulating valve means is used to open and close a third port formed in a passageway between the closed chamber and outlet, and a temperature responsive means operates the modulating valve means in response to temperature variation sensed at a local point. The temperature responsive means includes an output member movable in response to temperature variations of the environment surrounding the temperature sensing means and also includes a signal actuating means. This signal actuating means provides actuating signals to energize and deenergize the on — off control valve in response to temperature changes about the local temperature sensing means.

12 Claims, 8 Drawing Figures

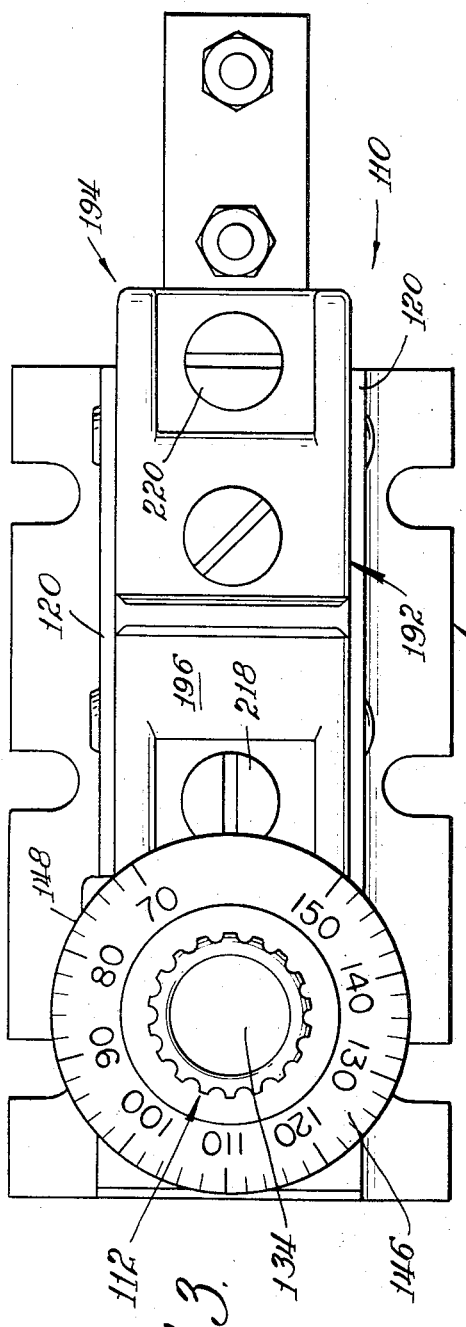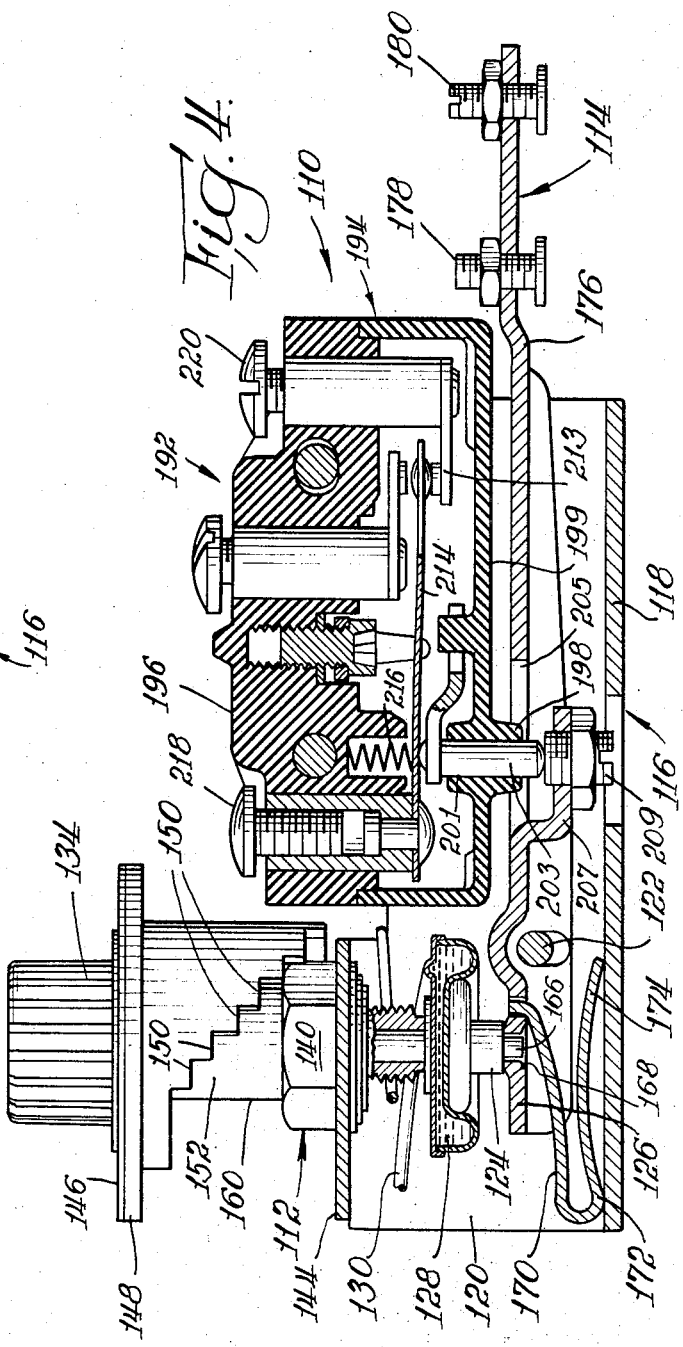

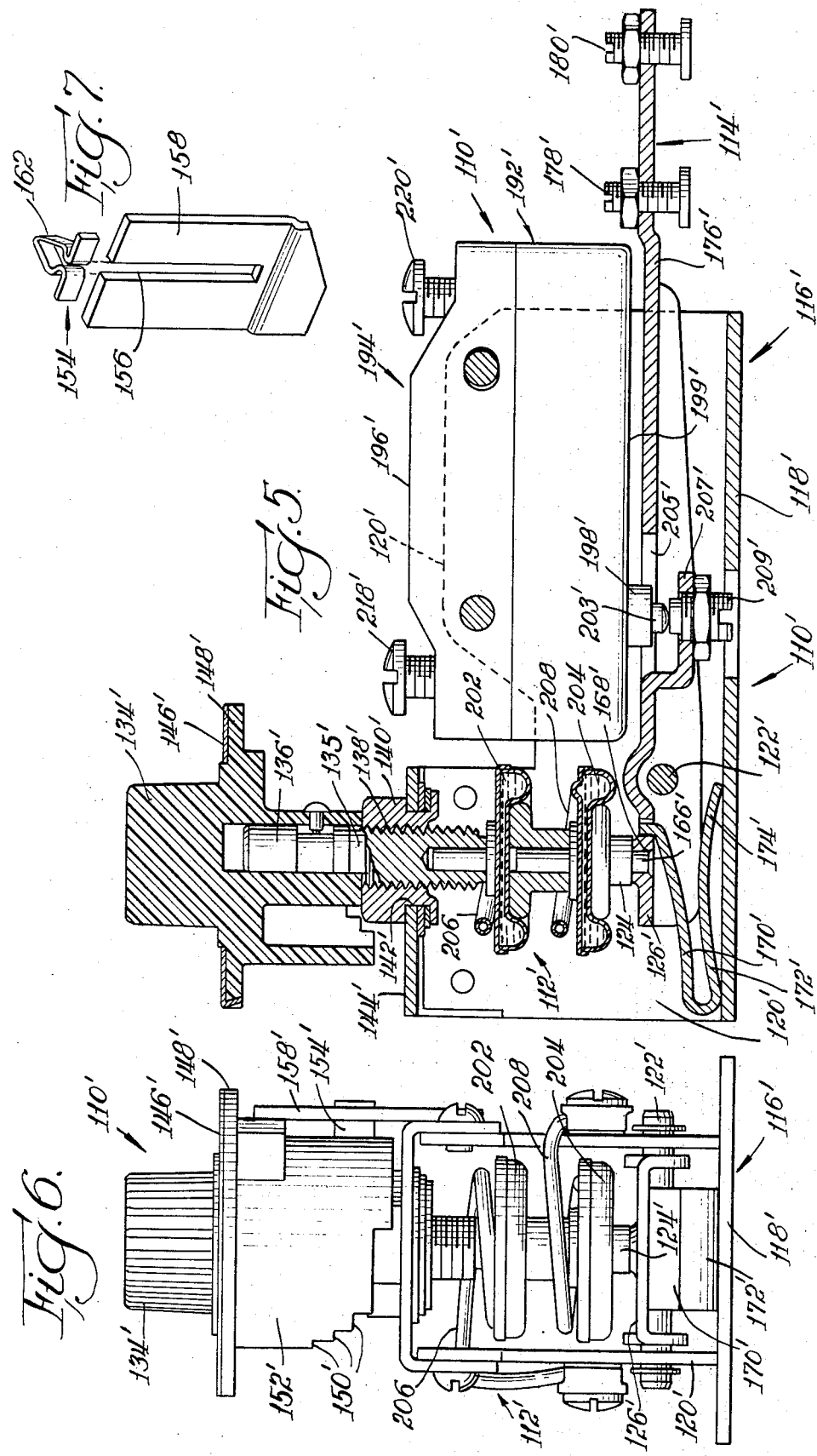

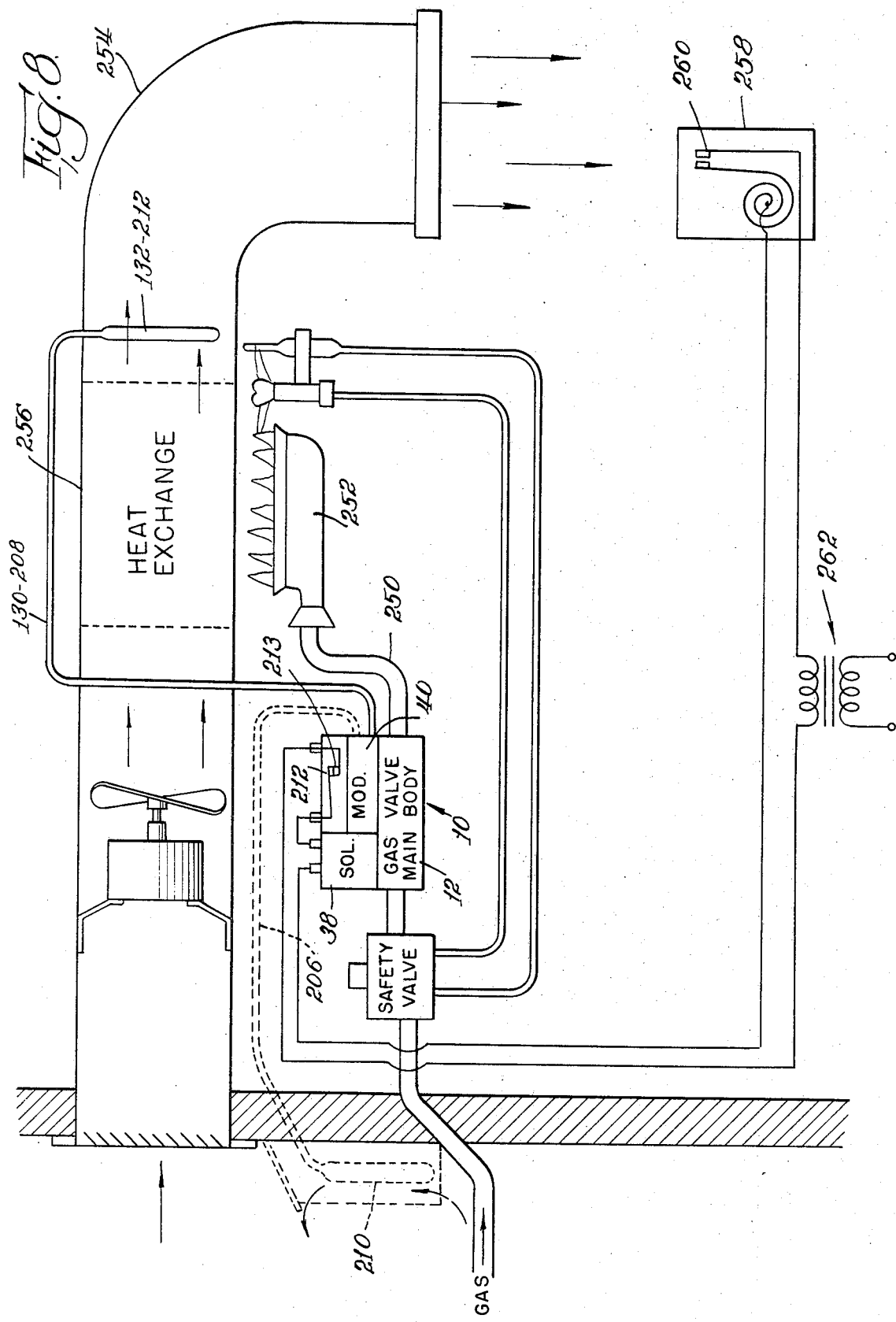

BULB MODULATING GAS VALVE

BACKGROUND OF THE INVENTION

This invention relates to flow control systems for controlling the flow of a fuel to a burner and, in particular to modulate the gas flow to the burner to hold the air temperature exiting from the heater system at a preset value.

In the design of a heating system using a conventional remote thermostat for controlling the temperature in the room, it is difficult to maintain the temperature in the comfort zone of the room at an acceptable level because it is not possible to instantaneously stop the heating cycle when the temperature at the remote thermostat reaches the desired setting. This is particularly true on mild days when it is easy to "overheat" a room.

Accordingly, one object of this invention is to provide temperature responsive means for maintaining the temperature of the air discharged into the comfort zone at a preset value, which includes means to terminate the heating cycle if the discharged air reaches a predetermined high value.

Another object of this invention is to provide automatic means for adjusting the air discharge temperature setting to a higher value in proportion to decreases in the outdoor temperature.

A further object of this invention is to provide a means to prevent surges in the fuel line to adversely affect the modulation of gas flow.

SUMMARY OF THE INVENTION

A gas valve embodying the principles of this invention comprises an on — off control valve and a modulator valve which will modulate the gas flow from high fire to low fire over a predetermined temperature throttling range. The on — off control valve includes a two-position valve means for providing the opening and closing of a second port disposed in a bypass passageway extending between the main gas inlet and the main gas control chamber. A remote thermostat provides actuating signals for energizing or deenergizing the on — off control valve to re-position the two-position valve means. A modulating valve means is used to open and close a third port formed in a passageway between main gas control chamber and the main gas outlet, and a temperature responsive means operates the modulating valve means in response to temperature variation sensed at a local point. The temperature responsive means includes an output member movable in response to temperature variations of the environment surrounding the temperature sensing means and also includes a signal actuating means. This signal actuating means provides actuating signals to energize and deenergize the on — off control valve in response to temperature changes about the local temperature sensing means.

DESCRIPTION OF DRAWINGS

For a better understanding of this invention, reference may be made to the accompanying drawings in which:

FIG. 3 is a top plan view of the temperature responsive apparatus used with the FIG. 1 embodiment;

FIG. 4 is a side elevational view partly in section of FIG. 3;

FIG. 5 is a side elevational view of the temperature responsive apparatus used with the FIG. 2 embodiment with the bellows actuator shown in cross section;

FIG. 6 is a end elevational view taken from the left end of FIG. 5;

FIG. 7 is a perspective view of the stop means for adjusting a temperature setting range for the bellows actuator of FIG. 5; and FIG. 8 is a schematic diagram of a heating system illustrating a gas valve embodying the principles of my invention.

DESCRIPTION OF PREFERRED EMBODIMENT

Figure 1:
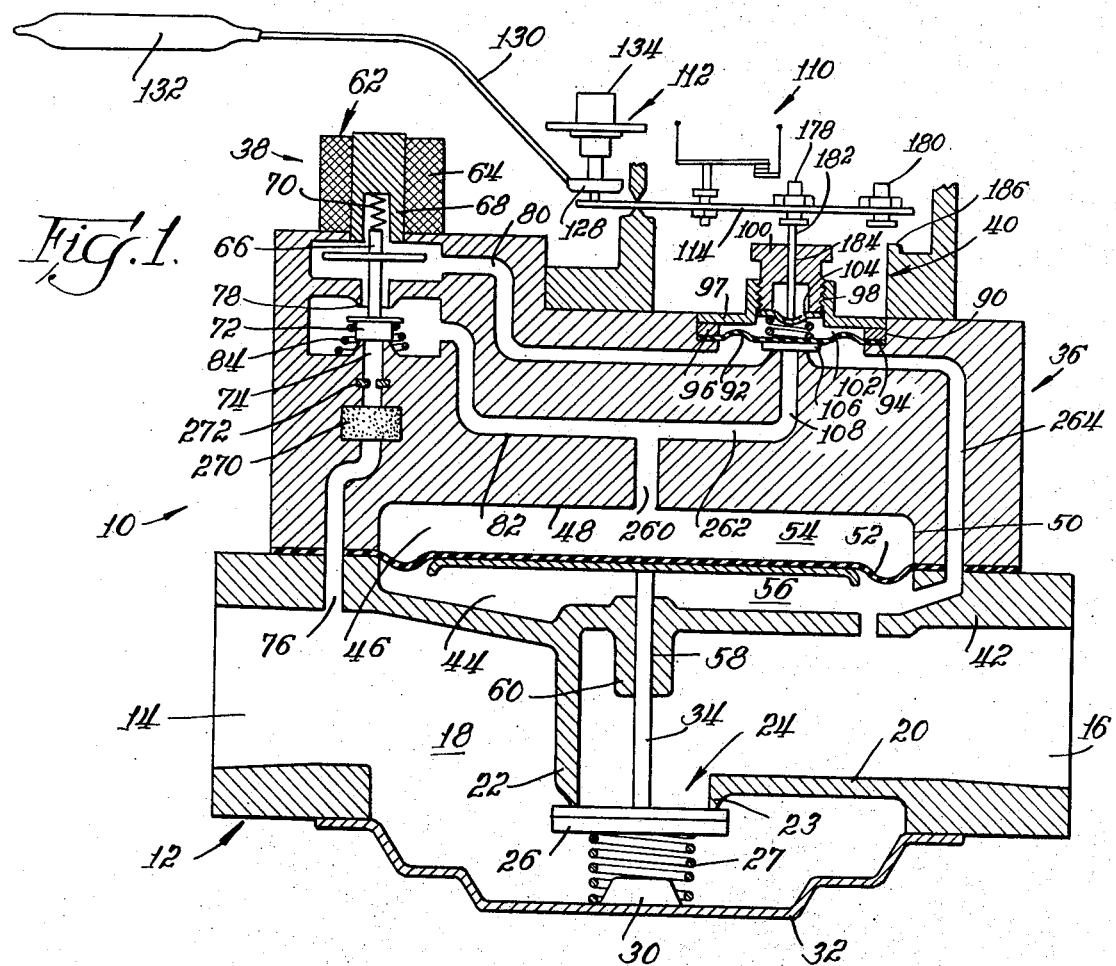
FIG. 1 is a sectional view of a gas valve embodying the principles of my invention.

Referring now to FIG. 1, there is shown a gas valve embodying the principles of my invention and generally designated by the reference numeral 10. Gas valve 10 has a main body portion 12 including an inlet 14 at the left hand side and an outlet 16 at the right hand side. Inlet 14 and outlet 16 are interconnected by a passageway 18 extending through the main body portion 12. At an intermediate location along passageway 18 there are provided inner vertical wall 22 and inner horizontal wall 20 which together form a circular opening 23 having a downwardly extending knife edge to define main gas port 24.

A disc valve 26 is provided to open and close port 24 to thereby control the flow of gas through passageway 18. Valve 26 is biased to the closed position by means of a spring 27 which is disposed between the lower surface of valve 26 and upstanding boss 30 secured to a bottom plate member 32 of main body portion 12, and is opened upon downward actuation of plunger 34.

Mounted on top the main body portion 12 is a gas regulator body 36 and includes means for mounting on — off control valve 38 and pressure responsive modulating valve 40. In the upper wall 42 of main body portion 12 there is formed a cavity 44 which mates with a similar cross-sectional shaped cavity 46 formed in the lower wall 48 of gas regulator body 36 to define an enclosed chamber 50. A main pressure diaphragm 52 is sandwiched between the lower wall 48 of gas regulator body 36 and the upper wall 42 of main body portion 12 in an outstretched condition to divide the closed chamber 50 into upper and lower control chambers 54 and 56, respectively. The upper end of plunger 34 is secured to the main diaphragm 52 and is slidably disposed in axial opening 58 of sleeve 60 integrally formed with the upper wall 42 of main body portion 12.

The on — off control valve comprises an electric solenoid 62 having field winding 64 which when deenergized causes the solenoid plunger 66 to move outwardly from its core 68 to the position shown in FIG. 1. Upon the deenergization of field coil 64, the plunger 66 returns to its resting position under the biasing action of spring 70. On — off control valve 38 also includes a two-position valve 72 which operates to close either port 74 provided at the exit of bypass passageway 76 or port 78 which connects passageway 80 to passageway 82. Valve 72 is urged upwardly to close port 78 under the pressure of spring 84 and is moved downwardly to close port 74 upon the deenergization of solenoid 62. The energization of solenoid 62 is controlled by the closing of switch contacts in a room thermostat.

Pressure responsive modulating valve 40 is mounted in a stepped cylindrical opening 90 of gas regulator body 36 and includes a pressure diaphragm 92 which is clamped about its periphery between annular ledge 94 and clamping washer 96 to provide a fluid-tight seal. Pressed into opening 90 in fluid tight engagement is a retainer member 97 having a central threaded portion 98. A low fire adjustment knob 100 is threadedly disposed in central threaded portion 98 to enclose the area above pressure diaphragm 92 providing closed chamber 102 above the diaphragm 92.

A spring 104 is disposed between the lower end of adjustment knob 100 and the center of pressure diaphragm 92, where the position of knob 100 within threaded portion 98 of retainer member 97 determines the minimum compression of spring 104. A disc-shaped seal 106 is secured to the lower surface of pressure diaphragm 92 at its center and cooperates with port 108 formed at the exit of passageway 82 to determine the amount of bleed gas flowing from passageway 82.

A temperature responsive apparatus 110 for actuating pressure diaphragm 92 in response to a sensed temperature is provided in a housing (not illustrated) mounted on top of gas regulator body 36. As diagramatically depicted in FIG. 1, temperature responsive apparatus 110 includes a bellows actuator 112 and a main lever 114.

Bellows actuator 112 and main lever 114 are assembled together in an open frame 116 as depicted in FIGS. 3–7. Frame 116 has a base 118 and a pair of upstanding side walls 120. A pivot pin 122 extends between the side walls 120 adjacent their lower ends for pivotally supporting main lever 114. Movement of lever 114 is controlled by the expansion and contraction of bellows actuator 112 by virtue of actuator 124 acting on the short arm 126 of lever 114.

The bellows element 128 is filled with an expansible material and is connected by capillary tube 130 to a sensor bulb 132 (FIG. 1) which is located at some remote point. The temperature setting for temperature responsive apparatus 110 is adjusted by manual manipulation of knob 134 which changes the vertical position of actuator 124. Knob 134 is keyed to the shank 136 of a range screw 135' and range screw 135' is screwed through a threaded aperture 138 formed in a collar 140 which is secured in opening 142 at the center of a bridge portion 144 extending across the top of side walls 120.

As illustrated in FIG. 3, a temperature setting scale 146 is provided on the annular flange 148 of knob 134 which cooperates with a pointer on the cover (not shown) for the temperature responsive apparatus 110. To control the range of temperatures that can be set by turning knob 134, a series of steps 150 (seven shown) is provided in arcuate skirt portion 152 of knob 134 which cooperates with an adjustable stop 154 vertically slidable in slot 156 of vertical bracket 158 (FIG. 7). The vertical edge 160 of skirt portion 152 provides the other end of the temperature setting range. Thus, by vertically shifting stop 154, which is formed by a V-shaped spring 162 (FIG. 7), along slot 156, the temperature setting range can be selectively varied.

Bellows actuator 124 has a nose portion 166 at its lowermost end that fits in aperture 168 formed in the short arm 126 of main lever 114. To limit the clockwise movement of lever 114, a V-shaped overtravel spring 172 of strong pliable material is employed with one arm 170 in engagement with the short arm 126 of main lever 114 and the other arm 174 engaging base 118.

The long arm 176 of main lever 114 has a pair of set screws 178 and 180 adjacent its outer end. Set screw 178 is disposed above actuator rod 182 of pressure responsive modulating valve 40 and upon clockwise movement of lever 114 pushes rod 182 downwardly through central opening 184 of adjustable knob 100 to compress spring 104. The other set screw 180 is disposed to engage the surface 186 of the pressure diaphragm housing diagramatically shown in FIG. 1, and serves as a stop for clockwise movement of lever 114. The purpose of set screw or stop 180 is to provide a maximum pressure adjustment for temperature responsive apparatus 110.

One important feature of this invention is a means for terminating the gas flow cycle from two separate locations in response to the temperature rising above a predetermined value at each location. As previously mentioned the energization of on — off valve 38 is controlled by a conventional room thermostat which closes switch contacts to energize solenoid 62 upon the temperature in the comfort zone dropping its setting. When on — off valve 38 is energized, modulating valve 40 becomes operative to regulate the flow of gas to the main burner. Occasionally, such as on a mild day, the temperature surrounding sensing bulb raises above its set point and yet the temperature in the comfort zone is still below its optimum setting so the on — off valve 38 remains energized. Upon such an occurrence it is desirable to have a second temperature responsive actuator located adjacent the remote bulb to deenergize solenoid 62 and terminate the flow of gas. For this purpose, temperature responsive device 110 further includes switch means 192.

Switch means 192 comprises a signal actuating or switch assembly 194 mounted between sidewalls 120 above the main lever 114. Switch assembly 194 is housed in an enclosed casing 196 having a sleeve 198 integrally formed in its bottom wall 199 with a central aperture 201 through which switch actuator or plunger 203 extends. Switch actuator 203 extends through opening 205 in main lever 114 and is adapted to be engaged by offset portion 207. A set screw 209 is threadedly mounted upwardly through an aperture in offset portion 207 to provide a means for adjusting the contact engaging position of switch actuator 203. Switch assembly 194 includes fixed contact 212 and movable contact 214, which is biased downwardly by spring 216 to provide a normally closed relation between contacts 213, 214. Terminal posts 218 and 220, respectively, provide the means for connecting the contacts 213 and 214 into the circuit for on — off solenoid 62.

There is diagramatically illustrated in FIG. 8, a typical heating installation which would employ a gas valve embodying the principles of my invention. Gas valve apparatus 10 is inserted in the fuel line 250 for the main burner 252. The sensing bulb 132 is positioned in the heating duct 254 at the output of the heat exchanger 256. A room thermostat 258 having switched contacts 260 is electrically connected in series in the electrical circuit powered by a-c source 262 for controlling the energization of solenoid valve 38. Normally closed switch contacts 213 and 214 are also connected in series in this circuit.

The heating cycle commences when the temperature in the comfort zone drops below the setting of room thermostat 258 to cause its contact 260 to close and energize on — off solenoid 62. The energization of on — off solenoid 62 causes its plunger 78 to be pulled upwardly to close port 78 and open port 74. The opening of port 74 allows the gas to flow through bypass passageway 76, port 74, passageway 82 and passageway 260 to the upper control chamber 54. This increase in pressure in the upper control chamber 54 moves diaphragm 52 downwardly to open the main gas port 24 allowing gas to flow to the main burner 252.

If the temperature surrounding bulb 132 is below the setting of temperature responsive device 112, the bellows element 128 will contract and cause the lever 114 to rotate in a clockwise direction about pivot 122. This clockwise movement is limited by the engagement of stop screw 180 with surface 186. As the temperature surrounding the sensing bulb 132 moves within the predetermined modulating band of bellows actuator 112, the bellows element 128 expands sufficiently to rotate main lever 114 in a counterclockwise direction to thereby reduce the compression on spring 104. This reduction in the compression of spring 104 permits the pressure regulator diaphragm 92 to open port 108 and bleed a portion of the gas flowing through passageway 82 into passageway 262, through port 108 and out through passageway 264 which is in communication with the lower control chamber 56 to thereby reduce the downward pressure on main diaphragm 52 and partially close off the port 24. This modulating action continues until the gas input to the heater is at the optimum point for maintaining the desired temperature at bulb 132.

When solenoid 62 is deenergized by the opening of either switch contacts 213, 214 of switch assembly 194 or switch contacts 260 of room thermostat 258, port 74 and port 78 are then simultaneously closed and opened, respectively. The flow of gas to the main burner is shut off by this action since the opening of port 78 relieves the pressure in upper chamber 54.

It is noted that bypass passageway 76 includes a filter 270 and lumped restrictor 272. The lumped restrictor 272 serves the important function of preventing surges in the gas passing through the bypass passageway 76 from detrimentally affecting the modulating action of this invention.

Figure 2:
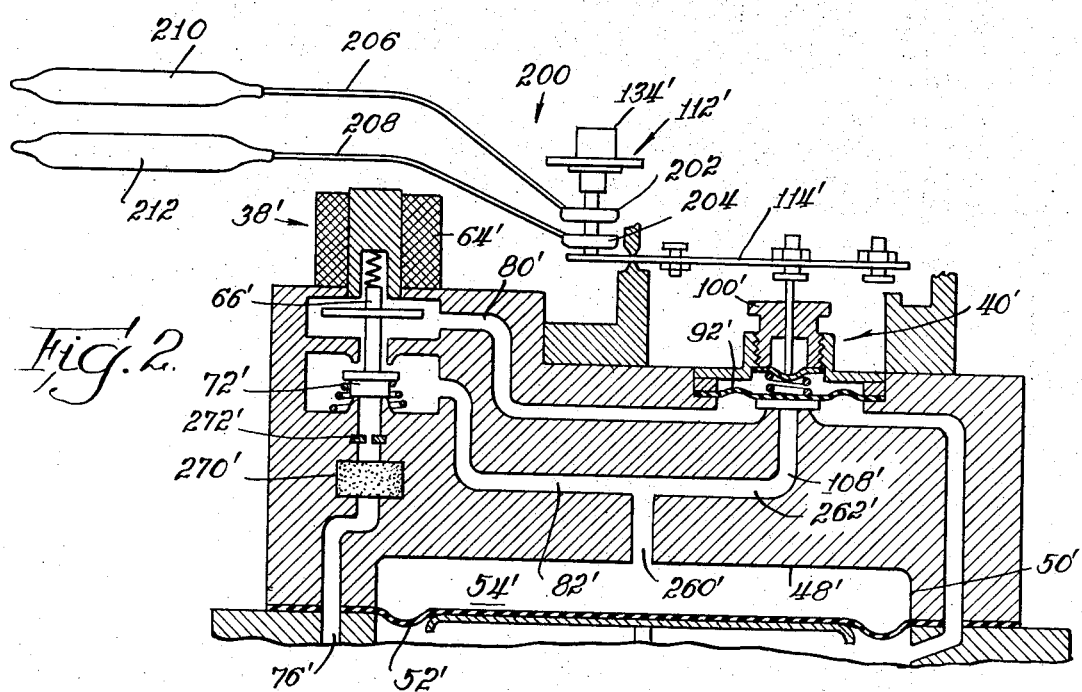
FIG. 2 is a sectional view of a modified version of FIG. 1 embodying the principles of my invention.

Referring now to FIGS. 2 and 5, there is shown a modified version of the gas valve described above. In the FIG. 2 embodiment, all parts are identical to the gas valve of FIG. 1, except the bellows actuator 200, and like parts are designated by prime reference numerals.

Bellows actuator 200 comprises a pair of bellows elements 202, 204 disposed in a tandem arrangement and each connected by capillary tubes 206, 208 to sensor bulbs 210 and 212, respectively. As depicted by the dotted lines in FIG. 8, one of these bulbs 210 would be located outdoors and thereby functions to accommodate changes in the outdoor temperature. The amount of adjustment is proportional to the volume of the outdoor bulb 210 to the indoor bulb 212. For example if the bulbs had equal volumes, each degree drop in the outside temperature would require the temperature sensed by the inside bulb 212 to be raised a degree to keep the output of modulating valve 40' the same.

I claim:

1. A gas valve comprising a central body having a gas passageway interconnecting an inlet and outlet and with a first port formed therebetween, a main valve disposed to open and close said first port, and a pressure diaphragm forming one wall of a closed chamber and operably connected to said main valve so that an increase in pressure within said chamber tends to open said first port, first passage means connecting said inlet and closed chamber and having a second port formed therebetween, on — off control valve including two-position valve means for opening or closing said second port, remote thermostatic means for providing actuating signals to energize or deenergize said control valve and reposition said two-position valve means, second passage means connecting said chamber to said outlet and having a third port formed therebetween, modulating valve means for opening and closing said third port, temperature responsive means including temperature sensing means, output member movable in response to temperature variations, and signal actuating means, said output member operably connected to said modulating valve means so that an increase in sensed temperature tends to open said third port, and said signal actuating means providing actuating signals in response to temperature changes about said temperature sensing means above and below a predetermined setting.

2. A gas valve as defined in claim 1, wherein said first passage means includes a lumped restrictor in its portion located between said inlet and said second port.

3. A gas valve as defined in claim 1, wherein said on — off control valve includes a solenoid operatively connected to said two-position valve means, said remote thermostatic means includes switch contacts connected in series with the field coil of said solenoid, and said signal actuating means includes noramlly closed switch contacts connected in series with said field coil and thermostatic switch contacts, said output member being disposed to open said switch contacts of said signal actuating means upon the temperature about said sensing means above said predetermined setting.

4. A gas valve as defined in claim 3, wherein said output member comprises a main lever pivotally supported above said modulating valve means and an actuator rod carried by one arm of said main lever and operably connected to said modulating valve means so that an increase in sensed temperature tends to open said third port, and wherein said signal actuating means is disposed above said one arm of said main lever and includes a slidably mounted plunger disposed to be engaged by said one arm and positioned to open said normally closed switch contacts upon an upward displacement thereof.

5. A gas valve as defined in claim 1, wherein said temperature sensing means comprises two remotely located sensing bulbs and wherein said output member includes a pair of bellows element connected to said sensing bulbs and disposed in a tandem arrangement.

6. A gas valve as defined in claim 5, wherein said output member further includes a pivotally mounted main lever having one arm operatively connected to said pair of bellows element for movement in response to their expansion or contraction, and the other arm disposed above said modulating valve means, and an actuator rod carried by said other arm and operatively connected to said modulating valve means so that an increase in sensed temperature tends to open said third port.

7. A gas valve comprising a central body having a gas passageway interconnecting an inlet and outlet and with a first port formed therebetween, a main valve disposed to open and close said first port, a pressure diaphragm forming one wall of a closed chamber and operably connected to said main valve so that an increase in pressure within said chamber tends to open said first port, first passage means connecting said inlet and closed chamber and having a second port formed therebetween, on — off control valve including a solenoid and a two-position valve means for opening or closing said second port upon the energization and deenergization of said solenoid, remote thermostatic means to energize or deenergize said solenoid in response to a drop or rise, respectively, in the temperatures at a remote location below and above preset values, second passage means connecting said chamber to said outlet and having a third port formed therebetween, modulating valve means for opening and closing said third port, temperature responsive means including temperature sensing means, output member movable in response to temperature variations about said temperature sensing means, and signal actuating means, said output member operably connected to said modulating valve means so that an increase in sensed temperature tends to open said third port, and said signal actuating means for deenergizing or energizing said solenoid in response to temperature changes about said temperature sensing means above and below a predetermined setting, respectively.

8. A gas valve as defined in claim 7, wherein said first passage means includes a lumped restrictor in its portion located between said inlet and said second port.

9. A gas valve as defined in claim 7, wherein said remote thermostatic means includes switch contacts connected in series with the field coil of said solenoid, and said signal actuating means includes normally closed switch contacts connected in series with said field coil and thermostatic switch contacts, said output member being disposed to open said switch contacts of said signal actuating means upon the temperature about said sensing means above said predetermined setting.

10. A gas valve as defined in claim 9, wherein said output member comprises a main lever pivotally supported above said modulating valve means and an actuator rod carried by one arm of said main lever and operably connected to said modulating valve means so that an increase in sensed temperature tends to open said third port, and wherein said signal actuating means is disposed above said one arm of said main lever and includes a slidably mounted plunger disposed to be engaged by said one arm and positioned to open said normally closed switch contacts upon an upward displacement thereof.

11. A gas valve as defined in claim 7, wherein said temperature sensing means comprises two remotely located sensing bulbs and wherein said output member includes a pair of bellows element connected to said sensing bulbs and disposed in a tandem arrangement.

12. A gas valve as defined in claim 11, wherein said output member further includes a pivotally mounted main lever having one arm operatively connected to said pair of bellows element for movement in response to their expansion or contraction, and the other arm disposed above said modulating valve means, and an actuator rod carried by said other arm and operatively connected to said modulating valve means so that an increase in sensed temperature tends to open said third port.

* * * * *